United States Patent
De Vaan

(10) Patent No.: US 6,715,879 B2
(45) Date of Patent: Apr. 6, 2004

(54) APPARATUS AND METHOD FOR A PROJECTION DEVICE WHEREIN THE POLARIZATION DIRECTION OF PROJECTED LIGHT ON A TRANSMISSIVE PROJECTION SCREEN IS CHANGED BY MEANS OF AN ADJUSTABLE LIQUID CRYSTAL DEVICE

(75) Inventor: Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/170,047

(22) Filed: Jun. 12, 2002

(65) Prior Publication Data

US 2002/0191155 A1 Dec. 19, 2002

(30) Foreign Application Priority Data

Jun. 14, 2001 (EP) ............................................. 01202298

(51) Int. Cl.⁷ ..................... G03B 21/14; G03B 21/60; G03B 21/56; G02F 1/1335
(52) U.S. Cl. ........................... 353/20; 349/9; 359/454; 359/456; 359/460
(58) Field of Search .................. 353/20, 7, 10; 359/443, 448, 454, 456, 457, 460; 349/5, 9, 33, 112

(56) References Cited

U.S. PATENT DOCUMENTS

| | | | |
|---|---|---|---|
| 5,694,245 A | 12/1997 | Goto et al. ................. 359/460 |
| 5,870,225 A | * 2/1999 | Ogino et al. ................. 359/457 |
| 5,900,977 A | 5/1999 | Hikmet ........................ 359/497 |
| 5,982,538 A | * 11/1999 | Shikama et al. ............ 359/465 |
| 6,163,402 A | * 12/2000 | Chou et al. ................. 359/443 |
| 6,239,907 B1 | * 5/2001 | Allen et al. ................. 359/443 |
| 6,392,726 B2 | * 5/2002 | Goto et al. ................... 349/86 |
| 6,449,089 B1 | * 9/2002 | Moshrefzadeh et al. .... 359/454 |
| 6,515,798 B1 | * 2/2003 | Chou et al. ................. 359/443 |

FOREIGN PATENT DOCUMENTS

JP        7333428        7/1995        ............ G02B/5/30

OTHER PUBLICATIONS

Patent Abstracts of Japan, Nozaki Yoshito, "Scattering Type Polarizing Sheet And Its Production," Publication No. 07333428, Dec. 22, 1995, Application No. 06155318, Jun. 14, 1994.

* cited by examiner

*Primary Examiner*—Russell Adams
*Assistant Examiner*—Melissa J Koval

(57) ABSTRACT

A projection device comprises a projector (1) for providing a light beam (3, 13) to be projected in polarized light. A adjustable liquid crystal element (4) for changing the direction of polarization is arranged between the projector (1) and the transmissive projection screen (2). The transmissive projection screen (2) comprises a polarizing diffusion layer (9). The extent of changing the direction of polarization by the adjustable liquid crystal element (4) for changing the direction of polarization is adjustable. The extent of changing the direction of polarization and hence the extent of diffusion in the transmissive projection screen (2) is adjustable by way of adjusting the voltage from a voltage source which is coupled to the adjustable liquid crystal element (4) for changing the direction of polarization.

5 Claims, 1 Drawing Sheet

APPARATUS AND METHOD FOR A PROJECTION DEVICE WHEREIN THE POLARIZATION DIRECTION OF PROJECTED LIGHT ON A TRANSMISSIVE PROJECTION SCREEN IS CHANGED BY MEANS OF AN ADJUSTABLE LIQUID CRYSTAL DEVICE

BACKGROUND OF THE INVENTION

The invention relates to a projection device comprising a projector for providing a light beam to be projected in polarized light, a means for changing the direction of polarization, and a transmissive projection screen, said means for changing the direction of polarization being arranged between the projector and the transmissive projection screen.

The invention also relates to a method of adjusting the diffusion of a projection screen in a projection device comprising a projector for providing a light beam to be projected in polarized light, a means for changing the direction of polarization, and a transmissive projection screen, said means for changing the direction of polarization being arranged between the projector and the transmissive projection screen.

Such a device and method are known from U.S. Pat. No. 5,694,245. This patent describes that the means for changing the direction of polarization causes the direction of projection of the light beam to rotate through a predetermined fixed angle.

A transmissive projection screen is intended for projecting an image from a position behind the screen and viewing the image from a position in front of the screen. Such screens comprise a diffusion layer for scattering the light projected by the projector from behind on the diffusion layer into more directions on the front side. To improve the visibility and brightness of the image on the screen, lenticular lens elements on the front side of the screen as well as black stripes have been used in the past. The diffusion of such screens, i.e. the quantity of light emitted in directions deviating from the normal on the screen is such that most light is directed towards the location where the designer of the projection device expects the viewers to be present, usually right in front of the screen. Consequently, the screen is built up in such a way that the brightest image can be viewed right in front of the screen. Another consequence is that, when the screen is viewed at an angle, the screen has a lower brightness than in the case where it is viewed right in front.

If much light is emitted straight to the front by the screen, this automatically results in a strong dependence of the viewing angle as regards the quantity of light that can be observed in other directions. There are people who regard such a viewing angle dependence as an unacceptable aspect and therefore do not purchase such a device, for example, a wide-screen television set.

OBJECTS AND SUMMARY OF THE INVENTION

It is an object of the invention to provide a projection device in which the above-mentioned drawbacks are mitigated.

To this end, a projection device according to the invention is characterized in that the transmissive projection screen comprises a polarizing diffusion layer, in that the extent of changing the direction of polarization of the means for changing the direction of polarization is adjustable, and in that adjusting means, coupled to the means for changing the direction of polarization, are provided for adjusting the extent of changing the direction of polarization.

It is thereby achieved that the extent of diffusion and hence the extent to which the light leaves the projection screen from each pixel into a plurality of directions is adjustable by adjusting the direction of polarization of the light beam to be projected. If, as is known from the prior art, a small extent of diffusion is desired, the direction of polarization of the light beam to be projected will be chosen to be such that the polarizing diffusion layer passes the light to a maximally unhindered extent. However, if a large range around the screen is desired with a minimal variation of brightness and as a function of the angle at which the image is viewed on the projection screen, the direction of polarization of the light beam to be projected should be adjusted by the adjustable means for changing the direction of polarization, such that there will be a great extent of diffusion in the polarizing diffusion layer.

Polarizing diffusion layers are known per se from, inter alia, U.S. Pat. No. 5,900,977 and the Japanese published patent application Ser. No. 07/333,428 and do not need any further description in this context.

A preferred embodiment of a projection device according to the invention is characterized in that the means for changing the direction of polarization comprises an adjustable liquid crystal element, in that the extent of changing the direction of polarization by the liquid crystal element is electrically adjustable, and in that the adjusting means are adapted to apply an adjustable electric field across the liquid crystal element.

Liquid crystals are suitable for changing the directions of polarization, and the extent of changing the direction of polarization can also be easily adjusted in liquid crystals by means of the intensity of an electric field across the liquid crystal element.

To this end, a method according to the invention is characterized in that a transmissive projection screen comprising a polarizing diffusion layer is used, in that an adjustable means for changing the direction of polarization is used, and in that the direction of polarization of the light beam to be projected is adjusted by the adjustable means for changing the direction of polarization.

It is thereby achieved that the viewing angle at which the projection screen can be viewed is adjustable in a simple way, namely by adjusting the means for changing the direction of polarization, without a too large extent of decreasing brightness.

These and other aspects of the invention are apparent from and will be elucidated with reference to the figure and the embodiments described hereinafter.

DESCRIPTION OF THE PREFERRED EMBODIMENTS

Figure 1:
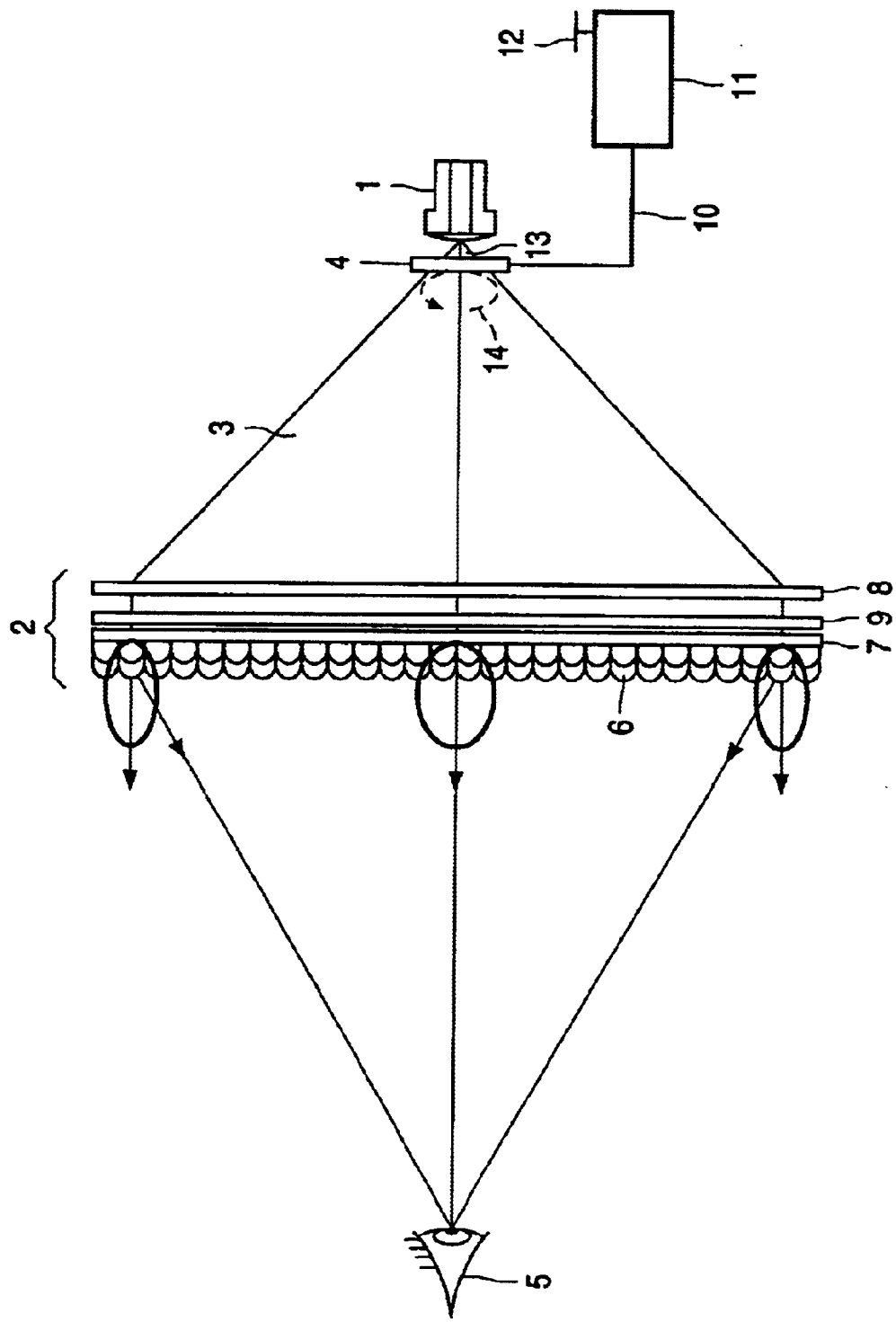
FIG. 1, the sole figure, is a schematic illustration of one embodiment of polarization device of the invention.

In the FIGURE, reference numeral 1 denotes a known projector for projecting an image on a projection screen 2 via a light beam to be projected, denoted by the reference numerals 13 and 3. An adjustable liquid crystal 4 is arranged between the projection screen 2 and the projector 1. The image on the projection screen 2 can be viewed by a viewer, one of whose eyes is denoted by the reference numeral 5. The projection screen 2 comprises known lenticular lenses 6, a diffusion screen 7 and a Fresnel lens 8. According to the invention, a polarizing diffusion layer 9 is provided between the Fresnel lens 8 and the diffusion screen 7. Polarizing diffusion layers are known per se, for example, from U.S. Pat. No. 5,900,977 and the Japanese published patent application Ser. No. 07/333,428.

The liquid crystal element 4 comprises in known manner electrodes which are not separately shown, which are connected via a line 10 to a voltage source 11 which is adjustable at a desired voltage by way of known adjusting means 12.

In known manner, the light from the light beam 13 between the projector 1 and the liquid crystal element 4 is polarized. Dependent on the voltage which is applied by the voltage source 11 across the liquid crystal element 4 via the line 10, the direction of polarization of the beam 3 is rotated through a given angle with respect to the direction of polarization of the beam 13, as is diagrammatically denoted by means of arrow 14.

The voltage which is applied to the liquid crystal element 4 by means of the voltage source 11 via the line 10 is adjustable by way of known adjusting means 12, such as knobs, sliders, output signals of programmable devices, etc.

Projection screen 2 is adapted in such a way that, without the presence of the polarizing diffusion layer 9, most light through the screen 7 and the lenticular lenses 6 leaves the projection screen 2 in a more or less forward direction. Consequently, the viewing angle, the angle from which the image can be viewed on the screen with sufficient brightness, is relatively small.

To increase the viewing angle, a greater extent of scattering is to take place in the projection screen 2. This scattering should preferably be adjustable. This is achieved by using a polarizing diffusion layer 9 in the projection screen 2, together with a means 4 for changing the direction of polarization, arranged between the projector 1 and the projection screen 2.

The polarizing diffusion layer 9 passes light having a first direction of polarization substantially unchanged and scatters light of a second direction of polarization perpendicular to the first direction of polarization to a very large extent.

By adjusting the voltage across the liquid crystal element 4, it can be ensured that the direction of polarization of the beam 3 corresponds to a direction of polarization for which the polarizing diffusion layer 9 is transparent, or a direction of polarization for which the polarizing diffusion layer 9 scatters light as much as possible, or for a direction of polarization which is in between said extremes.

In the foregoing, the adjustment of the electric voltage across the liquid crystal element 4 is shown by way of a means 12. Dependent on the voltage source 11, the voltage across the liquid crystal element 4 may be adjusted continuously or stepwise.

In the foregoing, a liquid crystal element 4 is described by way of example as a means for changing the direction of polarization. However, within the scope of the invention, other means for changing the direction of polarization of the beam 13 to the direction of polarization of the beam 3, for example, rotatable mirror faces, either or not combined with quarter-lambda plates, etc. are known to those skilled in the art.

After the foregoing description, those skilled in the art will be able to conceive many modifications and embodiments. All of these modifications and embodiments are considered to be within the scope of the present invention.

What is claimed is:

1. A projection device comprising a projector for providing a light beam to be projected in polarized light, a means for changing the direction of polarization, and a transmissive projection screen, said means for changing the direction of polarization being arranged between the projector and the transmissive projection screen, characterized in that the transmissive projection screen comprises a polarizing diffusion layer, in that the extent of changing the direction of polarization of the means for changing the direction of polarization is adjustable, and in that adjusting means, coupled to the means for changing the direction of polarization, are provided for adjusting the extent of changing the direction of polarization.

2. A projection device as claimed in claim 1, characterized in that the means for changing the direction of polarization comprises an adjustable liquid crystal element, in that the extent of changing the direction of polarization by the liquid crystal element is electrically adjustable, and in that the adjusting means are adapted to apply an adjustable electric field across the liquid crystal element.

3. A transmissive projection screen comprising a polarizing diffusion layer (9) intended for use in a device as claimed in claim 1.

4. A projector comprising an adjustable means for changing the direction of polarization as claimed in claim 1.

5. A method of adjusting the diffusion of a transmissive projection screen comprising a polarizing diffusion layer the method comprising the step of adjusting the direction of polarization of the light beam by adjusting an adjustable means for changing the direction of polarization.

* * * * *